United States Patent Office 3,741,872
Patented June 26, 1973

3,741,872
PROCESS FOR PURIFYING ENZYMES OF THE ASPARAGINASE-TYPE
Lucien Penasse, Paris, Pierre Barthelemy, Clichy-sous-Bois, and Denise Hasbiss, Paris, France, assignors to Roussel-UCLAF, Paris, France
No Drawing. Filed Mar. 12, 1971, Ser. No. 123,870
Claims priority, application France, Mar. 23, 1970, 10,333
Int. Cl. C07g 7/02
U.S. Cl. 195—66 A          6 Claims

ABSTRACT OF THE DISCLOSURE

Process for purifying enzyme of the asparaginase-type by precipitating the enzymes from aqueous solution by the addition of glycerol and ethyl alcohol.

BACKGROUND OF THE INVENTION

This invention relates to a process for purifying enzymes.

This invention has as an object a process for purifying enzymes of the asparaginase-type, and in particular, L-asparaginase.

It is known that L-asparaginase isolated from *Serratia marcesans* and *Escherichia coli* possesses a strong antineoplastic activity.

It is also well known that it is necessary that the L-asparaginase possessing the desired enzymatic activity be of such purity as to effect efficacious treatment without the occurrence of secondary effects, such as sensitization or allergic reactions.

Processes for purifying L-asparaginase are already known. Thus purification can be effected by chromatography on a column or by fractional precipitation with a mineral salt such as ammonium sulfate. These processes, however, are not of very great interest on an industrial scale and, moreover, in the case of the use of mineral salts, one is confronted with the problem of eliminating mineral traces in the purified product, generally involving an additional purification operation such as dialysis.

One can likewise effect purification of L-asparaginase by heating an enzymatic solution at a temperature of 55° C. for ten minutes; this method, described in French Pat. No. 1,585,246, allows the denaturation of most of the proteins present initially, which are then precipitated and easily separated from the L-asparaginase.

However, although this method is interesting because of its technical simplicity, it does not enable one to obtain an L-asparaginase possessing sufficient purity because of the difficulty in maintaining a uniform temperature throughout the medium.

We have now developed a process for purifying enzymes of the asparaginase-type, particularly L-asparaginase, which enables one to avoid the disadvantages of the prior art methods.

SUMMARY OF THE INVENTION

The present invention describes a process for purifying an enzyme of the asparaginase type, in particular one which has undergone a preliminary purification, comprising precipitating the enzyme from an aqueous solution by adding to the solution of the enzyme glycerol and ethyl alcohol.

The process is particularly useful for the purification of L-asparaginase, and there is described a process for purifying L-asparaginase which has undergone a preliminary purification which comprises precipitating the L-asparaginase from an aqueous solution at a pH of about 5 and a temperature from about 0° to 25° C. by adding to the solution glycerol and ethyl alcohol wherein the proportion of glycerol to ethyl alochol by volume is from about 1:5 to 3:5.

DETAILED DESCRIPTION OF THE INVENTION

The process of the present invention comprises causing the enzyme, having undergone a preliminary purification by known and conventional methods, to precipitate by the addition of a mixture of glycerol and ethyl alcohol to an aqueous solution of the enzyme.

It has been found that such a process permits a slow and progressive precipitation to occur, specifically favoring purification of the enzyme and the formation of crystals.

Purification according to this process can be effected at a temperature between 0° C. and 25° C., and preferably between 0° C. and 5° C.

The proportion of glycerol and ethyl alcohol used can vary between 1 and 3 parts of glycerol to 5 parts of ethyl alcohol by volume. In a preferred method, 1.5 to 2 parts of glycerol to 5 parts of ethyl alcohol by volume is used.

While the glycerol and the ethyl alcohol can be first mixed together and then added to the aqueous enzyme solution, it is found that best results are obtained when the glycerol is added first, followed by the ethyl alcohol.

The starting aqueous solution of L-asparaginase can be prepared by any of the known methods. It should be understood that purification of the enzymes according to the process of the invention can be effected on solutions having both high and low enzymatic activity, and where the solutions are not very rich in enzymes, the process can be applied several times.

The following examples illustrate the invention without however limiting it.

Example I

To 5 cc. of an aqueous solution of crude L-asparaginase at pH=5.5 containing 1785 I.U. of L-asparaginase and 19 mg. of proteins (specific activity of 94 I.U./mg.), is added between 0° C. and 5° C. under agitation 1.5 cc. of glycerol, followed by 5 cc. of ethyl alcohol.

The resultant mixture is agitated for a further two hours and thirty minutes at the same temperature and the precipitate thus formed is isolated by centrifugation. Analysis of the precipitate is carried out after it is dissolved in water.

There is thus obtained a mixture containing 1400 I.U. of L-asparaginase and 11 mg. of proteins (specific activity of 127 I.U./mg.). Yield: 78.5%.

Example II

To 5 cc. of an aqueous solution of crude L-asparaginase at pH=5.5, containing 5255 I.U. of asparaginase and 40.8 mg. of proteins (specific activity of 128.5 I.U./mg.) which is cooled in a bath of iced water, there is added successively with agitation 2 cc. of glycerol followed by 5 cc. of ethanol. Agitation is maintained for a further five minutes, and the mixture is allowed to stand over night at a temperature between 0° C. and 5° C. The precipitate is isolated by centrifugation and dissolved in water for analysis. There is thus obtained a solution containing 5100 I.U. of L-asparaginase and 23.2 mg. of proteins (specific activity of 220 I.U./mg.). Yield: 97.2%.

Example III

Using the same starting material as in Example II and operating at 20° C. under the same conditions, one obtains a product which crystallizes in fine needles and contains 5130 I.U. of L-asparaginase and 24.8 mg. of proteins (specific activity of 207 I.U./mg.). Yield: 97.7%.

We claim:
1. A process for purifying an enzyme of the asparaginase-type which has undergone a preliminary purification which comprises precipitating the enzyme from an aqueous solution by adding thereto glycerol and ethyl alcohol, wherein the proportion of glycerol to ethyl alcohol by volume is from about 1:5 to 3:5.

2. The process of claim 1 wherein the enzyme is L-asparaginase.

3. The process of claim 1 wherein the precipitation of the enzyme is carried out at a temperature between 0° and 25° C.

4. The process of claim 1 wherein the precipitation is effected at a pH of about 5.

5. The process of claim 1 wherein the glycerol is first added to the aqueous solution followed by the ethyl alcohol.

6. A process for purifying L-asparaginase which has undergone a preliminary purification which comprises precipitating the L-asparaginase from an aqueous solution at a pH of about 5 and a temperature from about 0° to 25° C. by adding to the solution glycerol and ethyl alcohol wherein the proportion of glycerol to ethyl alcohol by volume is from about 1.5:5 to 2:5.

References Cited
UNITED STATES PATENTS

| | | | |
|---|---|---|---|
| 3,594,281 | 7/1971 | Ho | 195—63 |
| 3,650,902 | 3/1972 | Wagner et al. | 195—66 A |

LIONEL M. SHAPIRO, Primary Examiner